United States Patent [19]

Clark et al.

[11] Patent Number: 5,510,398

[45] Date of Patent: Apr. 23, 1996

[54] HIGHLY FILLED EXTRUDED THERMOPLASTIC COMPOSITIONS HAVING A SPECKLED SURFACE APPEARANCE

[75] Inventors: Angelika H. Clark, Mt. Vernon; Eileen B. Walsh, Evansville, both of Ind.

[73] Assignee: General Electric Company, Pittsfield, Mass.

[21] Appl. No.: 224,354

[22] Filed: Apr. 7, 1994

[51] Int. Cl.⁶ .................. C09D 5/29; C08K 5/52
[52] U.S. Cl. .................. 523/171; 524/35; 524/140; 524/147; 524/148; 524/423; 524/424; 524/425; 524/432; 524/439; 524/449; 524/494
[58] Field of Search .................. 524/35, 423, 424, 524/449, 140, 147, 148, 423, 425, 432, 439, 494; 523/171

[56] References Cited

U.S. PATENT DOCUMENTS

| | | | |
|---|---|---|---|
| 3,966,669 | 6/1976 | Wolfe | 524/904 |
| 4,480,061 | 10/1984 | Coughlin et al. | 524/35 |
| 5,115,016 | 5/1992 | Dickens et al. | 524/449 |
| 5,116,889 | 5/1992 | Gilbert et al. | 524/35 |
| 5,187,202 | 2/1993 | Walkowski | 524/35 |
| 5,214,088 | 5/1993 | Allen et al. | 524/413 |
| 5,260,367 | 11/1993 | Toda et al. | 524/449 |
| 5,269,991 | 12/1993 | Gueret | 264/73 |

FOREIGN PATENT DOCUMENTS

| | | |
|---|---|---|
| 0604080 | 6/1994 | European Pat. Off. |
| 54-144454 | 11/1979 | Japan . |
| 62-096565 | 5/1987 | Japan . |
| 2245037 | 9/1990 | Japan . |
| 348155 | 12/1992 | Japan . |
| WO-A-9207026 | 4/1992 | WIPO . |

*Primary Examiner*—Kriellion S. Morgan

[57] ABSTRACT

A highly filled, extruded thermoplastic material which has a smooth, uniform speckled surface without any secondary finishing operations. The thermoplastic material contains a polyalkylene terephthalate resin, a polycarbonate resin, a large quantity of a filler material, a stabilizer for the resin materials and a sufficient quantity of a non-dispersing pigment to give the extruded thermoplastic material a speckled surface appearance.

24 Claims, No Drawings

HIGHLY FILLED EXTRUDED THERMOPLASTIC COMPOSITIONS HAVING A SPECKLED SURFACE APPEARANCE

BACKGROUND OF THE INVENTION

Highly filled thermoplastic molding compositions having ceramic like properties may be formed into diverse articles for use in numerous applications. In the decorative surfacing industry custom colors and special-effect appearances are key properties for customer acceptance. A granite, fleck-like or speckled look is especially desired and is available in both high pressure laminates and thermoset acrylic or thermoset polyesters used as decorative surfaces. However, the fleck-like or speckled surface produced in such thermoset materials is not smooth or uniform and therefore requires a secondary finishing operation such as sanding or the like.

The applicants have discovered that it is possible to provide a speckled or fleck-like appearance to a thermoplastic material by including therein a non-dispersing pigment prior to extruding such material. Surprisingly, this thermoplastic material having the non-dispersing pigment can be extruded with a sufficiently smooth and uniform surface that no secondary finishing operation is required.

Accordingly, it is a primary object of the invention to provide a highly filled, extruded thermoplastic material having a speckled surface appearance.

It is also an object of this invention to provide a highly filled, extruded thermoplastic material which can be extruded into a sheet having a smooth, uniform speckled surface without any secondary finishing operations.

These and other objects of the invention will become apparent from the specification.

SUMMARY OF THE INVENTION

The present invention provides a highly filled, extruded thermoplastic composition having a speckled surface which comprises:

(a) 1–70 weight percent of a polyalkylene terephthalate resin;

(b) 0–35 weight percent of an aromatic polycarbonate resin;

(c) an effective amount of a stabilizer;

(d) optionally, an impact modifier;

(e) 0–35 weight percent of a polyetherester or polyetherimide ester resin;

(f) 30–80 weight percent of an inorganic filler;

(g) from 0–30 percent of a fibrous glass reinforcing filler; and (h) an effective amount of a non-dispersing pigment. The amount of resin (a) must be equal to or greater than (b). The inorganic filler is selected from barium sulfate, strontium sulfate, zinc oxide, zinc sulfate, or mixtures thereof. The amount of the non-dispersing pigment is sufficient to provide the extruded thermoplastic composition with a speckled surface. It is also desirable that the speckled surface be smooth and uniform. It is particularly preferred that the surface of the extruded material be smooth, uniform and speckled without any secondary finishing operations.

DETAILED DESCRIPTION OF THE INVENTION

The present invention is particularly well suited for thermoplastic materials which can provide a ceramic-like look and feel such as highly filled crystalline polyesters and their blends. Polyesters suitable for preparing the present compositions include those comprising structural units of the formula (I)

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of formula (I) are poly(alkylene dicarboxylates), elastomeric polyesters, liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl endgroups on the polyester, depending on the ultimate end-use of the composition.

In some instances, it is desirable to reduce the number of acid endgroups, typically to less than about 30 micro equivalents per gram, with the use of acid reactive species. In other instances, it is desirable that the polyester has a relatively high carboxylic end group concentration, e.g., about 5–250 micro equivalents per gram or, more preferable, about 20–70 micro equivalents per gram.

The $R^1$ radical may be, for example, a $C_{2-10}$ alkylene radical, a $C_{6-10}$ alicyclic radical, a $C_{6-20}$ aromatic radical or a polyoxyalkylene radical in which the alkylene groups contain about 2–6 and most often 2 or 4 carbon atoms. The $A^1$ radical in the above formula (I) is most often p- or m-phenylene or a mixture thereof. As previously noted, this class of polyester includes the poly(alkylene terephthalates) and the polyarylates. Such polyesters are known in the art as illustrated by the following patents, which are incorporated herein by reference.

| | | | |
|---|---|---|---|
| 2,465,319 | 2,720,502 | 2,727,881 | 2,822,348 |
| 3,047,539 | 3,671,487 | 3,953,394 | 4,128,526 |

The poly(alkylene terephthalates) are often the preferred polyesters for the present invention, with poly-(ethylene terephthalate) (PET), poly-(cyclohexylene terephthalate) (PCT), and poly (butylene terephthalate) (PBT) being the most preferred members of this class. Various mixtures of PET, PCT and PBT are also sometimes very suitable.

The polyester may include structural units of the formula (II)

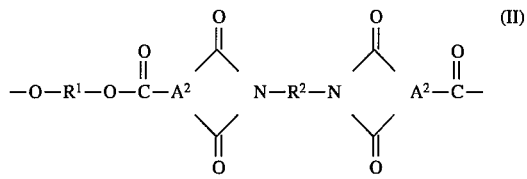

wherein $R^1$ is as previously defined. $R^2$ is a polyoxyalkylene radical and $A^2$ is a trivalent aromatic radical, usually derived from trimellitic acid and has the structure (III)

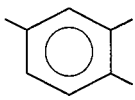 (III)

Such polymers and their mode of preparation are described, example, in U.S. Pat. Nos. 4,544,734; 4,556,705; and 4,556,688, which are incorporated herein by reference.

Because of the tendency of polyesters to undergo hydrolytic degradation at the high extrusion and molding temperatures encountered by the compositions of this invention, it is preferred that the polyester be substantially free of water.

The polyesters generally have number average molecular weights in the range of about 20,000–70,000, as determined by gel permeation cromatography, and an intrinsic viscosity/ (IV) at 30° C. in a mixture of 60 percent (by weight) phenol and 40 percent 1,1,2,2-tetrachloroethane of 0.4 to 1.5 dl/g, and preferabley 0.6 to 0.8 dl/g.

The amount of the polyester according to the present invention varies with the properties which are required by the given application but preferably the total amount of polyester ranges from about 0–70 percent by weight and more preferably from about 5 to 50 percent by weight and most preferably from about 10 to 30 percent by weight.

The aramaic polycarbonate resins of the invention are, of themselves, well known compounds which are described along with methods for their preparation in U.S. Pat. Nos. 3,989,672; 3,275,601 and 3,028,365, all of which are incorporated herein by reference.

They may be conveniently prepared by the reaction of at least one dihydric phenol and a carbonate precursor. The dihydric phenols employed in the practice of this invention are known dihydric phenols which may be represented by the general formula:

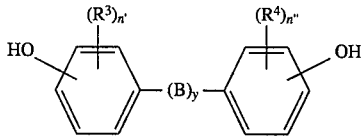

wherein:

$R^3$ is independently selected from halogen, monovalent hydrocarbon, and monovalent hydrocarbonoxy radicals;

$R^4$ is independently selected from halogen, monovalent hydrocarbon, and monovalent hydrocarbonoxy radicals;

B is selected from divalent hydrocarbon radicals,

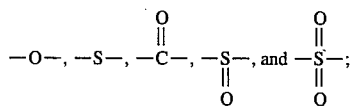

n' and n" are independently selected from integers having a value of from 0 to 4 inclusive; and y is either zero or one.

The monovalent hydrocarbon radicals represented by $R^3$ and $R^4$ include the alkyl, cycloalkyl, aryl, aralkyl, and alkaryl radicals.

The preferred alkyl radicals are those containing from 1 to about 12 carbon atoms. The preferred cycloalkyl radicals are those containing from 4 to about 12 ring carbon atoms. The preferred aryl radicals are those containing from 6 to 12 ring carbon atoms, i.e., phenyl, naphthyl, and biphenyl. The preferred aralkyl and alkaryl radicals are those containing from 7 to about 14 carbon atoms.

The preferred halogen radicals represented by $R^3$ and $R^4$ are chlorine and bromine.

The monovalent hydrocarbonoxy radicals may be represented by the general formula —$OR^5$ wherein $R^5$ has the same meaning as $R^3$ and $R^4$. The preferred hydrocarbonoxy radicals are the alkoxy and the aryloxy radicals.

The divalent hydrocarbon radicals represented by B include the alkylene, alkylidene, cycloalkylene, and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

Some illustrative non-limiting of suitable dihydric phenols include:

2,2-bis(4-hydroxyphenyl)propane (bisphenol-A);
2,2-bis(3,5-dimethyl-4-hydroxyphenyl)propane;
2,2-bis(3,5-dibromo-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)cyclododecane;
1,1-bis(4-hydroxyphenyl)decane;
1,4-bis(4-hydroxyphenyl)butane;
p,p'-dihydroxydiphenyl;
bis(4-hydroxyphenyl)ether;
1,1-bis(4-hyroxyphenyl)3,3,5-trimethylcyclohexane;
and 4,4'-thiodiphenol.

Other useful dihydric phenols are described, inter alia, in U.S. Pat. Nos. 3,028,365; 2;999,835; 3,148,172; 3,271,368, 2,991,273; 3,271,367; 3,280,078; 3,014,891 and 2;999,846, all of which are incorporated herein by reference.

The carbonate precursors employed in the practice of the instant invention include the carbonyl halides, the bishaloformates, and the diarylcarbonates. The carbonyl halides include carbonyl bromide, carbonyl chloride, and mixtures thereof. Typical of the diarylcarbonates are diphenyl carbonate; di(halophenyl) carbonates such as di(chlorophenyl)carbonate, di(bromophenyl) carbonate, di(trichlorophenyl)carbonate, and di(tribromophenyl)carbonate; di(alkylphenyl)-carbonates such as di(tolyl)carbonate; dinaphthyl carbonate; di(halonaphthyl)carbonates; and naphthyl phenyl carbonate. The bishaloformates suitable for use herein include the bishaloformates of dihydric phenols such as the bischloroformates of hydroquinone and bisphenol-A; the bishaloformates of glycols such as the bischloroformates of ethylene glycol, neopentyl glycol, and polyethylene glycol.

The polycarbonates of the instant invention contain at least one recurring structural unit represented by the formula:

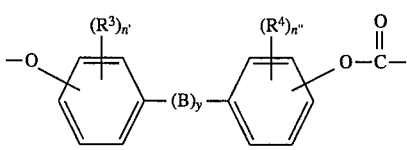

wherein:

B, $R^3$, $R^4$, n', n" and y are as defined above. Monofunctional phenols can be added as end capping agents to the polymerization to control molecular weight and provide desired properties. The term "polycarbonate" according to the invention also contemplates resins such as polyarylates, polyestercarbonates or the like.

The instant polycarbonates are preferably high molecular weight aromatic carbonate polymers having an intrinsic viscosity, as determined in chloroform at 25° C. of from about 0.3 to about 1.5 dl/gm, preferably from about 0.45 to about 1.0 dl/gm. These polycarbonates may be branched or unbranched and generally will have a weight average molecular weight of from about 10,000 to about 200,000, preferably from about 20,000 to about 100,000 as measured by gel permeation chromatography.

Preferred polycarbonates are those derived from bisphenol A and tetrabromo bisphenol A.

The amount of the polycarbonate resin in the composition is preferably between about 0 and about 35 weight percent, and more preferably between about 5 and 25 weight percent, and most preferably between about 10 an 20 weight percent of the thermoplastic composition.

The branched polycarbonates may be prepared by adding a branching agent during polymerization. These branching agents are well known and may comprise organic polyfunctional organic compounds containing at least three functional groups which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bisphenol, trisphenol TC (1,3,5-tris((p-hydroxyphenyl)isopropyl)benzene), trisphenol PA (4(4(1,1-bis(p-hydroxyphenyl)-ethyl)α,α-dimethylbenzyl)phenol), 4-chloroformyl phthalic anhydride, trimesic acid and benzophenone tetracarboxylic acid.

The branching agent may be added at a level of about 0.05–2.0 weight percent. Branching agents and procedures for making branched polycarbonates are described in U.S. Pat. Nos. 3,635,895; 4,001,184; and 4,204,047 which are incorporated by reference.

In the practice of the present invention, it may be desirable to add an impact modifier. Although the specific type of impact modifier is not critical, it is preferred to use an impact modifier which is based on a high molecular weight styrenediene rubber.

A preferred class of rubber materials are copolymers, including random, block and graft copolymers of vinyl aromatic compounds and conjugated dienes. Exemplary of these materials there may be given hydrogenated, partially hydrogenated, or non-hydrogenated block copolymers of the A-B-A and A-B type wherein A is polystyrene and B is an elastomeric diene, e.g. polybutadiene, polyisoprene, radial teleblock copolymer of styrene and a Y conjugated diene, acrylic resin modified styrene-butadiene resins and the like; and graft copolymers obtained by graft-copolymerization of a monomer or monomer mix containing a styrenic compound as the main component to a rubber-like polymer. The rubber-like polymer used in the graft copolymer are as already described herein including polybutadiene, styrene-butadiene copolymer, acrylonitrile-butadiene copolymer, ethylene-propylene copolymer, ethylene butylene copolymer, polyacrylate and the like. The styrenic compounds includes styrene, methylstyrene, dimethylstyrene, isopropylstyrene, α-methylstyrene, ethylvinyltoluene and the like.

Procedures for the preparation of these polymers are found in U.S. Pat. Nos. 4,196,116; 3,299,174 and 3,333,024, all of which are incorporated by reference.

The thermoplastic multi-block copolymer elastomers that are used in this invention are copolyetheresters and copolyetherimide esters.

The copolyetheresters consist essentially of a multiplicity of recurring long chain ester units and short chain ester units joined head-to-tail through ester linkages, said long chain ester units being represented by the formula:

and said short chain ester units being represented by the formula:

where G is a divalent radical remaining after the removal of terminal hydroxyl groups from a poly(alkylene oxide) glycol having a number average molecular weight of about 400–6000; R is a divalent radical remaining after reaction of carboxyl groups from an aromatic dicarboxylic acid having a molecular weight less than about 300, and D is a divalent radical remaining after reaction of hydroxyl groups from a diol having a molecular weight less than about 250; provided said short chain ester units are about 20–85 percent by weight of said copolyetherester.

The term "long-chain ester units" as applied to units in a polymer chain of the copolyetherester refers to the reaction product of a long-chain glycol with a dicarboxylic acid. Such "long-chain ester units", which are a repeating unit in the copolyetherester, correspond to formula (I) above. The long-chain glycols are polymeric glycols having terminal (or as nearly terminal as possible) hydroxy groups and a molecular weight from about 400–6000. The long-chain glycols used to prepare the copoly-etheresters are poly(alkylene oxide) glycols. Representative long-chain glycols are poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetra-hydrofuran with minor amounts of a second monomer such as ethylene oxide.

The term "short-chain ester units" as applied to units in a polymer chain of the copolyetherester refers to low molecular weight chain units having molecular weights less than about 550. They are made by reacting a low molecular weight diol (below about 250) with an aromatic dicarboxylic acid having a molecular weight below about 300, to form ester units represented by formula (II) above.

The term "low molecular weight diols" as used herein should be construed to include equivalent ester-forming derivatives, provided, however, that the molecular weight requirement pertains to the diol only and not to its derivatives.

Preferred are diols with 2–15 carbon atoms such as ethylene, propylene, tetramethylene, pentamethylene, 2,2-dimethyltrimethylene, hexamethylene, and decamethylene glycols, dihydroxycyclohexane, cyclohexane dimethanol, and the unsaturated 1,4-butenediol.

The term "dicarboxylic acids" as used herein, includes equivalents of dicarboxylic acids having two functional groups which perform substantially like dicarboxylic acids in reaction with glycols and diols in forming copolyetherester polymers. These equivalents include esters and ester-forming derivatives, such as acid anhydrides. The molecular weight requirement pertains to the acid and not to its equivalent ester or ester-forming derivative.

Among the aromatic dicarboxylic acids for preparing the copolyetherester polymers, those with 8–16 carbon atoms are preferred, particularly the phenylene dicarboxylic acids, i.e., phthalic, terephthalic and isophthalic acids and their dimethyl ester.

The short-chain ester units will constitute about 20–85 weight percent of the copolyetherester. The remainder of the copolyetherester will be long-chain ester units comprising about 15–80 weight percent of the copolyetherester.

Preferred copolyetheresters are those prepared from dimethyl terephthalate, 1,4-butanediol, and poly(tetramethylene oxide) glycol having a molecular weight of about 600–2000. Optionally, up to about 30 mole percent of the dimethyl terephthalate in these polymers can be replaced by dimethyl phthalate or dimethyl isophthalate. Polymers in which a portion of the butanediol is replaced by butenediol are also preferred.

The dicarboxylic acids or their derivatives and the polymeric glycol are incorporated into the copolyetherester in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated depends on their molar concentration, boiling points and relative reactivities. The total amount of diol incorporated is still the difference between moles of diacid and polymeric glycol.

The copolyetheresters described herein are made by a conventional ester interchange reaction which, preferably, takes place in the presence of a phenolic antioxidant that is stable and substantially nonvolatile during the polymerization.

The copolyetherimide ester elastomers differ from the copolyetheresters only in that repeating hard segments and soft segments are joined through imidoester linkages rather than simple ester linkages. The hard segments in these elastomers consist essentially of multiple short chain ester units represented by the formula:

(II)

described hereinbefore. The soft segments in these polymers are derived from poly(oxyalkylene diimide) diacids which can be characterized the following formula:

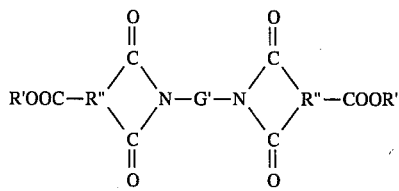

wherein each R" is independently a trivalent organic radical, preferably a $C_1$ to $C_{20}$ aliphatic, aromatic or cycloaliphatic trivalent organic radical; each R' is independently hydrogen or a monovalent organic radical preferably selected from the group consisting of $C_1$ to $C_6$ aliphatic and cycloaliphatic radicals and $C_6$ to $C_{12}$ aromatic radicals, e.g., benzyl, most preferably hydrogen; and G' is the radical remaining after the removal of the terminal (or as nearly terminal as possible) amino groups of a long chain ether diamine having an average molecular weight of from about 600 to about 12,000, preferably from about 900 to about 4,000.

Representative long chain ether glycols from which the polydxyalkylene diamine is prepared include poly(ethylene ether)glycol; poly(propylene ether)-glycol; poly(tetramethylene ether)glycol; random or block copolymers of ethylene oxide and propylene oxide, including propylene oxide terminated poly(ethylene ether)glycol; and random or block copolymers of tetrahydrofuran with minor amounts of a second monomer such as methyl tetrahydrofuran (used in proportion such that the carbon-to-oxygen mole ratio in the glycol does not exceed about 4.3). Especially preferred poly(alkylene ether) glycols are poly(propylene ether)glycol and poly(ethylene ether)glycols end capped with poly(propylene ether) glycol and/or propylene oxide.

In general, the polyoxyalkylene diamines will have an average molecular weight of from about 600 to 12,000, preferably from about 900 to about 4000.

Useful in capping the polyoxyalkylene diamines are various tricarboxylic compounds. The tricarboxylic component may be a carboxylic acid anhydride containing an additional carboxylic group or the corresponding acid thereof containing two imide forming vicinal carboxyl groups in lieu of the anhydride group. Mixtures thereof are also suitable. The additional carboxylic group much be esterifiable and preferably is substantially nonimidizable.

The tricarboxylic acid materials can be characterized by the following formula:

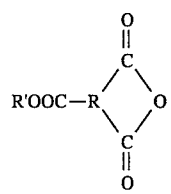

where R is a trivalent organic radical, preferably a $C_2$ to $C_{20}$ aliphatic, aromatic, or cycloaliphatic trivalent organic radical and R' is preferably hydrogen or a monovalent organic radical preferably selected from the group consisting of $C_1$ to $C_6$ aliphatic or cycloaliphatic radicals and $C_6$ to $C_{12}$ aromatic radicals, e.g., phenyl; most preferably hydrogen. A preferred tricarboxylic component is trimellitic anhydride.

These copolymers are described in U.S. Pat. Nos. 4,988,740; 4,544,734; 4,556,688 and 4,579,884 all of which are incorporated by reference.

It is further preferred to employ an inorganic filler to the thermoplastic resin to impart a series of additional beneficial properties, not the least of which are thermal stability, increased density, and texture. Inorganic fillers are well known in the art and most inorganic fillers known in the art which provide a ceramic-like feel can be used in the present invention.

Preferred inorganic fillers which are employed in the present thermoplastic compositions include: zinc oxide, barium sulfate, zirconium silicate, strontium sulfate, as well as mixtures of the above. The preferred form of barium sulfate will have a particle size of 0.1–20 microns. The barium sulfate may be derived from a natural or a synthetic source.

The molding compositions may include from 20–85% by weight, preferably 30–75% by weight or most preferably 30–45% by weight of total composition of an inorganic filler component. For certain applications where a ceramic like product is desired, more than 50%, or more preferably 60–85% by weight of the total composition of filler component should be employed.

The thermoplastic resin composition may also include other additives which are well known in the art. For example, the resin composition may contain external lubricants, antioxidants, flame retardants or the like. If desired, ultraviolet stabilizers, flow aids, metal additives for electromagnetic radiation shielding such as nickel coated graphite fibers, anti static agents, coupling agents such as amino silanes and the like may also be added.

The filamentous glass to be employed as a reinforcing agent in the present compositions is well known to those skilled in the art and is widely available from a number of manufacturers. For compositions ultimately to be employed for electrical uses, it is preferred to use fibrous glass filaments comprised of lime-aluminum borosilicate glass that is relatively sodium free. This is known as "E" glass, however other glass compositions are useful. All such glasses are contemplated as within the scope of the present invention. The filaments are made by standard processes, e.g., by steam or air blowing, flame blowing and mechanical pulling. The preferred filaments for plastics reinforcement are made by mechanical pulling. The filament diameters preferably range from about 3 to about 20 microns, but this is not critical to the present invention. It is known, however to those skilled in the art, that smaller filament diameters will also increase the strength.

The length of the glass filaments and whether or not they are bundled into fibers and the fibers bundled into yarns, ropes or rovings, or woven into mats, and the like are also not critical to the invention. However, in preparing the compositions of the present invention, it is convenient to use filamentous glass in the form of chopped strands of from one-eighth to about 2 inches long. In articles molded from the compositions, on the other hand, even shorter lengths will be encountered because, during compounding, considerable fragmentation will occur.

In the thermoplastic compositions which contain a polyester and a polycarbonate resin, it is preferable to use a stabilizer material. Typically, such stabilizers are used at a level of 0.01–10 weight percent and preferably at a level of from 0.05–2 weight percent. The preferred stabilizers include an effective amount of an acidic phosphate salt; an acid, alkyl, aryl or mixed phosphite having at least one hydrogen or alkyl group; a Group IB or Group IIB metal phosphate salt; a phosphorous oxo acid, a metal acid pyrophosphate or a mixture thereof. The suitability, of a particular compound for use as a stabilizer and the determination of how much is to be used as a stabilizer may be readily determined by preparing a mixture of the polyester component, the polycarbonate and the filler with and without the particular compound and determining the effect on melt viscosity or color stability or the formation of interpolymer. The acidic phosphate sales include sodium dihydrogen phosphate, mono zinc phosphate, potassium hydrogen phosphate, calcium hydrogen phosphate and the like. The phosphites may be of the formula:

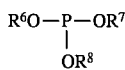

where $R^6$, $R^7$ and $R^8$ are independently selected from the group consisting of hydrogen, alkyl and aryl with the proviso that at least one of $R^6$, $R^7$ and $R^8$ is hydrogen or alkyl.

The phosphate sales of a Group IB or Group IIB metal include zinc phosphate, copper phosphate and the like. The phosphorous oxo acids include phosphorous acid, phosphoric acid, polyphosphoric acid or hypophosphorous acid.

The polyacid pyrophosphates of the formula:

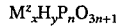

wherein M is a metal, x is a number ranging from 1 to 12 and y is a number ranging 1 to 12, n is a number from 2 to 10, z is a number from 1 to 5 and the sum of (xz)+y is equal to n+2.

These compounds include $Na_3HP_2O_7$; $K_2H_2P_2O_7$; $Na_4P_2O_7$; $KNaH_2P_2O_7$ and $Na_2H_2P_2O_7$. The particle size of the polyacid pyrophosphate should be less than 75 microns, preferably less than 50 microns and most preferably less than 20 microns.

The purpose of the non-dispersing pigments in the present invention is to impart to the thermoplastic composition a granite, fleck-like or speckled surface appearance. This speckled surface is achieved through a non-dispersing pigment as opposed to a filler because the non-dispersing pigment does not appreciably add to the base color of the resin. Rather, the non-dispersing pigment provides a separate, visibly distinct and identifiable color at numerous sites across the surface of the material wherever the pigment material is visible. In other words, the speckle is visible in the filled polymer matrix as a distinct region of contrasting color.

Although this speckled surface appearance can be achieved with a number of non-dispersing pigments, it is desirable from a manufacturing standpoint that the pigment be such that the thermoplastic material can be extruded into a sheet which is sufficiently smooth and uniform on the surface that it need not undergo any secondary or subsequent finishing operations such as sanding or the like. However, the present inventors surprisingly discovered through extensive experimentation with a variety of non-dispersing pigments that only certain types of non-dispersing pigments having a particular shape provide the speckled look and the smooth, uniform surface without secondary finishing operations.

In particular, it is preferred that the surface of the thermoplastic composition have an RMS value of no greater than about 200, and more preferably no greater than about 130, and most preferably no greater than about 75. RMS stands for root mean square and the RMS value can be measured, e.g., by using a Taylor Hobson Subtronic 3P over a specific distance of the material (0.01" is usually sufficient).

Thus, in order to achieve a suitable RMS value without subsequent finishing operations, it is preferred that the non-dispersing pigments have a large aspect ratio (aspect ratio being defined as the ratio of the diameter to thickness of the particle), with the relative thickness being the more important measurement. It is preferred that the non-dispersing pigment have an aspect ratio of greater than about 20, more preferably greater than about 40, and most preferably greater than about 60. It has been determined by the present inventors that when a non-dispersing pigment having a low aspect ratio (spherical or large particles) is used, the extruded thermoplastic composition has an uneven or rough surface and a secondary sanding operation is required to remove the surface irregularities.

Materials which typically have high aspect ratios and are thus particularly well suited for the present invention include cellulose fibers, mica, metallic flakes, carbon fibers, or similar such fibrous materials. Other potential non-dispersing pigments which are useful provided the aspect ratio is suitable include titanium whiskers and other natural fibers as well as ground thermoset, thermoplastic or rubber materials. The most preferred non-dispersing materials include cellulose fibers, mica and metallic flakes. The non-dispersing pigments may be uncoated or coated with organic or inorganic coatings such as azo dyes or mineral coatings. Additionally, the non-dispersing pigments may also be added in combination with colorants or added into an already colored thermoplastic composition.

It is not necessary to add large amounts of the non-dispersing pigments to the composition in order to achieve a speckled surface appearance. It is usually sufficient to add between about 0.1 and 5 weight percent pigment based on the weight of the composition and preferably between about 1 weight percent and about 3 weight percent of the composition.

Preferred compositions include the following:

| | |
|---|---|
| polybutylene terephthalate | 7–25 wt. % |
| polyethylene terephthalate | 3–10 wt. % |
| aromatic polycarbonate | 10–25 wt. % |
| stabilizer | 0.01–10 wt. % |
| impact modifier | 0–15 wt. % |
| barium sulfate | 40–79.99 wt. % |
| non-dispersing pigment | 1–5% |

Other preferred compositions include:

| | |
|---|---|
| polybutylene terephthalate | 15–30 wt. % |
| polyethylene terephthalate | 5–15 wt. % |
| branched arom. polycarbonate | 20–30 wt. % |
| stabilizer | 0.05–2 wt. % |
| barium sulfate | 30–59.95 wt. % |
| non-dispersing pigment | 1–5% |
| polybutylene terephthalate | 6–10 wt. % |
| polyethylene terephthalate | 5–10 wt. % |
| polycarbonate | 12–20 wt. % |
| stabilizer | 0.01–5 wt. % |
| impact modifier | 1–10 wt. % |
| barium sulfate | 59–72.99 wt. % |
| non-dispersing pigment | 1–5% |
| polybutylene terephthalate | 15–50 wt. % |
| polyethylene terephthalate | 5–15 wt. % |
| polyetherimide ester | 5–15 wt. % |
| barium sulfate | 50–75 wt. % |
| non-dispersing pigment | 1–5% |

As used herein and in the appended claims, the term "weight percent" means the percent by weight of each component based on the total weight of composition.

The invention also includes the novel articles made from the compositions of the invention and methods of extrusion, blow molding, sheet forming and thermoforming.

These articles may comprise, e.g., countertops, sinks, shower stalls, building panels, bathroom and kitchen fixtures, plumbing fixtures, tiles, floor coverings, profile moldings, picture flames, as well as other extruded articles of manufacture.

The method of extruding or thermoforming is facilitated by the addition of a rubbery impact modifier and/or a polycarbonate or especially a branched polycarbonate to a highly filled composition, i.e. more than 50 weight percent of an inorganic filler such as barium sulfate, which includes a polybutylene terephthalate and/or a polyethylene terephthalate resin.

EXAMPLES

In order to the determine the viability of various non-dispersing pigments for providing extruded thermoplastic compositions with a smooth, uniform, speckled surface, the following pigments were extruded into a highly filled polyester/polycarbonate composition:

| Resin Comp. | Pigment | RMS Value | Extruder |
|---|---|---|---|
| 1 | 1% ReedSpectrum Black Whiskers | 21 | 1¼" Killion |
| 1 | 0.67% Kemira mica | 105 | 1¼" Killion |
| 2 | 2% SAFAS Galaxy Granules (sanded) | 82 | 1¼" Killion |
| 2 | 2% SAFAS Galaxy Granules (unsanded) | 233 | 1¼" Killion |
| 2 | 2% ReedSpectrum Brown Speckles & 0.5% PBT Black Speckles | 44 | 2½" HPM, 3:1 L/D |
| 2 | 2% ReedSpectrum Brown Speckles & 4% PBT Black Speckles | 43 | 2½" HPM, 3:1 L/D |

ReedSpectrum Speckles were dyed cellulose fibers, 300 × 300 × 7µ, aspect ratio 43.

ReedSpectrum Black Whiskers were an FDA carbon fiber, aspect ratio about 50.

Kemira mica was 500–900µ × 25µ.

Galaxy Granules, a thermoset, cured acrylic or polyester, were 10–100µ, spherical (aspect ratio about 1).

RMS was measured using a Taylor Hobson Subtronic 3P over a distance of 0.01".

Resin Comp. 1 comprised: 31 parts polyethylene terephthalate resin; 22.3 parts polycarbonate (LEXAN ® ML8131); 7 parts brominated polycarbonate copolymer (LEXAN ® ML1624); 32 parts BaSO₄; 0.2 part polyethylene-18; 5 parts sodium acid pyrophosphate (SAPP); 0.2 part IRGANOX ® 1010; 0.3 part TINUVIN ® 234; and 2 parts TEFLON/Polycarbonate Concentrate.

Resin Comp. 2 comprised: 17 parts polyester resin (VALOX ® 315); 17.3 parts PET/SEBS Rubber (KRATON ® G-1651) Concentrate; 27.8 parts branched polycarbonate (LEXAN ® 151-111); 37 parts BaSO₄; 0.2 part PETS-18; 0.1 part WESTON ® DPDP; 0.1 part IRGANOX ® 1010, and 0.5 part TINUVIN ® 234.

Obviously, other modifications and variations of the present invention are possible in the light of the above teachings. For example, the mineral filled compositions can be rendered flame retardant or colored using conventional materials. It is, therefore, to be understood that changes may be made in the particular embodiments described above which are within the scope of the invention as defined in the appended claims.

We claim:

1. A highly filled, extruded thermoplastic composition having a speckled surface which comprises:

(a) from 0–70 weight percent of a polybutylene terephthalate resin;

(b) from 0–70 weight percent of a polyethylene terephthalate resin, with the proviso that the sum of the amounts of the polybutylene terephthalate resin and the polyethylene terephthalate resin must be at least 10 weight percent of the total composition;

(c) from 0–35 weight percent of an aromatic polycarbonate resin wherein the amount of (a)+(b) is equal to or greater than (c);

(d) an effective amount of a stabilizer;

(e) from 0–15 weight percent of an impact modifier;

(f) from 0–35 weight percent of a polyetherester or polyetherimide ester resin;

(g) from 30–80 weight percent of an inorganic filler selected from the group consisting of barium sulfate, strontium sulfate, zinc oxide and zinc sulfate;

(h) from 0–30 percent of a fibrous glass reinforcing filler; and (i) an effective amount of a non-dispersing pigment sufficient to provide said extruded thermoplastic composition with a speckled surface, said non-dispersing pigment having an aspect ratio greater than 20.

2. The thermoplastic composition of claim 1, wherein said non-dispersing pigment has a structure that provides a smooth, uniform surface for said extruded thermoplastic composition without any secondary finishing operations.

3. The thermoplastic composition of claim 2, wherein the surface of said thermoplastic composition has an RMS value of less than about 200.

4. The thermoplastic composition of claim 3, wherein the surface of said thermoplastic composition has an RMS value of less than about 130.

5. The thermoplastic composition of claim 4, wherein the surface of said thermoplastic composition has an RMS value of less than about 75.

6. The thermoplastic composition of claim 2, wherein the aspect ratio of said non-dispersing pigment is greater than about 20.

7. The thermoplastic composition of claim 6, wherein the aspect ratio of said non-dispersing pigment is greater than about 40.

8. The thermoplastic composition of claim 7, wherein the aspect ratio of said non-dispersing pigment is greater than about 60.

9. The thermoplastic composition of claim 1, wherein said non-dispersing pigment comprises cellulose fibers, mica, metallic flakes, carbon fibers of mixtures thereof.

10. The thermoplastic compositions of claim 9, wherein said non-dispersing pigments are coated.

11. The thermoplastic composition of claim 7, wherein said non-dispersing pigment comprises cellulose fibers, mica, metallic flakes, carbon fibers, ground thermoplastic or thermoset materials, ground rubber materials or mixtures thereof.

12. The thermoplastic compositions of claim 2, wherein said non-dispersing pigments are present in the thermoplastic composition in an amount of from about 0.1 percent to about 5 percent by weight based on the weight of the thermoplastic composition.

13. The thermoplastic compositions of claim 12, wherein said non-dispersing pigments are present in the thermoplastic composition in an amount of from about 1 percent to about 3 percent by weight based on the weight of the thermoplastic composition.

14. The thermoplastic composition of claim 1, wherein said stabilizer is selected from the group consisting of acidic phosphate compounds; phosphites of the formula:

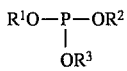

wherein $R^1$, $R^2$ and $R^3$ are independently selected from the group consisting of hydrogen, alkyl and aryl with the proviso that at least one of $R^1$, $R^2$ and $R^3$ is hydrogen or alkyl; polyacid pyrophosphates of the formula:

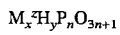

wherein M is a metal, x is a number from 1–12 and y is a number from 2–10; z is a number from 1–5 and the sum of $(xz)+y=n+2$; phosphorous oxo-acids, phosphates of Group IB or Group IIB metals, acid phosphate salts, Group IB or Group IIB metal phosphate salts; and mixtures thereof.

15. The thermoplastic composition of claim 1, wherein the composition comprises:
   (a) from 6–10 weight percent of said polybutylene terephthalate;
   (b) from 5–10 weight percent of said polyethylene terephthalate;
   (c) from 12–20 weight percent of said aromatic polycarbonate wherein in said molding composition, the ratio of polybutylene terephthalate to polyethylene terephthalate to aromatic polycarbonate is about 2:1:3;
   (d) from 0.01–5 weight percent of a said stabilizer;
   (e) from 1–10 weight percent of said impact modifier;
   (f) from 50–80 weight percent of barium sulfate; and
   (g) from about 1 to about 3 weight percent of said non-dispersing pigment.

16. A highly filled, extruded thermoplastic composition having a speckled surface which consists essentially of:
   (a) from 0–70 weight percent of a polybutylene terephthalate resin;
   (b) from 0–70 weight percent of a polyethylene terephthalate resin, with the proviso that the sum of the amounts of the polybutylene terephthalate resin and the polyethylene terephthalate resin must be at least 10 weight percent of the total composition;
   (c) from 0–35 weight percent of an aromatic polycarbonate resin wherein the resin of (a)+(b) is equal to or greater than (c);
   (d) an effective amount of a stabilizer;
   (e) from 0–15 weight percent of an impact modifier;
   (f) from 0–35 weight percent of a polyetherester or polyetherimide ester resin;
   (g) from 30–80 weight percent of an inorganic filler selected from the group consisting of barium sulfate, strontium sulfate, zinc oxide and zinc sulfate;
   (h) from 0–30 percent of a fibrous glass reinforcing filler; and
   (i) an effective amount of a non-dispersing pigment sufficient to provide said extruded thermoplastic composition with a speckled surface, said non-dispersing pigment having an aspect ratio greater than 20.

17. A highly filled, extruded thermoplastic composition having a speckled surface which comprises:
   (a) 1–70 weight percent of at least one polyalkylene terephthalate resin;
   (b) from 1–35 weight percent of an aromatic polycarbonate resin wherein the amount of resin (a) is equal to or greater than amount of resin (b);
   (c) an effective amount of a stabilizer;
   (d) from 0–15 weight percent of an impact modifier;
   (e) from 0–35 weight percent of a polyetherester or polyetherimide ester resin;
   (f) from 30–80 weight percent of an inorganic filler selected from the group consisting of barium sulfate, strontium sulfate, zinc oxide and zinc sulfate; and
   (g) an effective amount of a non-dispersing pigment sufficient to provide said extruded thermoplastic composition with a speckled surface, said non-dispersing pigment having an aspect ratio greater than 20.

18. The thermoplastic composition of claim 17, wherein said non-dispersing pigment has a structure that provides a smooth, uniform surface for said extruded thermoplastic composition without any secondary finishing operations.

19. The thermoplastic composition of claim 18, wherein the surface of said extruded thermoplastic composition has an RMS value of less than about 200.

20. A process for producing a thermoplastic material having a smooth, uniform surface without secondary finishing operations, comprising extruding the highly filled thermoplastic material of claim 1.

21. An article of manufacture comprising the extruded, speckled flat sheet composition resulting from the extrusion of the composition of claim 1.

22. An article of manufacture comprising an extruded, speckled thermoformed sheet composition resulting from the extrusion and thermoforming of the composition of claim 1.

23. An article of manufacture comprising the profile extruded, speckled sheet composition resulting from the profile extrusion of the composition of claim 1.

24. The composition of claim 1, wherein said thermoplastic composition is colored.

* * * * *